United States Patent [19]

Eaton

[11] Patent Number: 5,492,210
[45] Date of Patent: Feb. 20, 1996

[54] RATIO INTERCHANGE CONTROL VALVING

[75] Inventor: James R. Eaton, Carmel, Ind.

[73] Assignee: General Motors Corporation, Detroit, Mich.

[21] Appl. No.: 310,447

[22] Filed: Sep. 22, 1994

[51] Int. Cl.⁶ .......................... F16D 25/08; F16D 25/10
[52] U.S. Cl. ..................... 192/87.13; 192/87.18; 192/109 F; 192/3.57; 477/166
[58] Field of Search ................ 192/87.13, 87.14, 192/87.18, 109 F, 3.57, 3.58, 48.1; 477/166, 180

[56] References Cited

U.S. PATENT DOCUMENTS

| | | | |
|---|---|---|---|
| 3,762,518 | 10/1973 | Hilpert | 192/87.13 |
| 4,058,193 | 11/1977 | Morisawa et al. | 192/87.13 X |
| 4,085,834 | 4/1978 | Kreitzberg | 192/87.13 |
| 5,009,118 | 4/1991 | Raszkowski et al. | 74/331 |
| 5,115,722 | 5/1992 | Ichihashi et al. | 192/87.18 X |
| 5,307,914 | 5/1994 | Elijah | 192/87.13 |
| 5,352,161 | 10/1994 | Mowatt et al. | 192/87.13 X |
| 5,399,130 | 3/1995 | Long | 477/130 |
| 5,407,042 | 4/1995 | Fukui et al. | 192/3.58 |
| 5,425,688 | 6/1995 | Raszkowski | 477/117 |

*Primary Examiner*—Andrea L. Pitts
*Attorney, Agent, or Firm*—Donald F. Scherer

[57] ABSTRACT

A hydraulic control for an automatically shifted power transmission has an electronically controlled governor pressure source which provides a speed and throttle sensitive pressure for controlling the shift points and trim boost in the transmission control. An inhibitor circuit is activated in the event of a discontinuance of the electrical control, resulting in maximum governor pressure, to permit selected vehicle operation in one forward ratio and a reverse ratio. Each ratio interchange is controlled by a respective shift valve and clutch control valve. Each clutch control valve has an integral trim control which is effective to control the pressure rise in the on-coming clutch without bypassing fluid to an exhaust. Also during a ratio interchange, an off-going clutch is controlled at a reduced pressure during a portion of the ratio interchange.

2 Claims, 6 Drawing Sheets

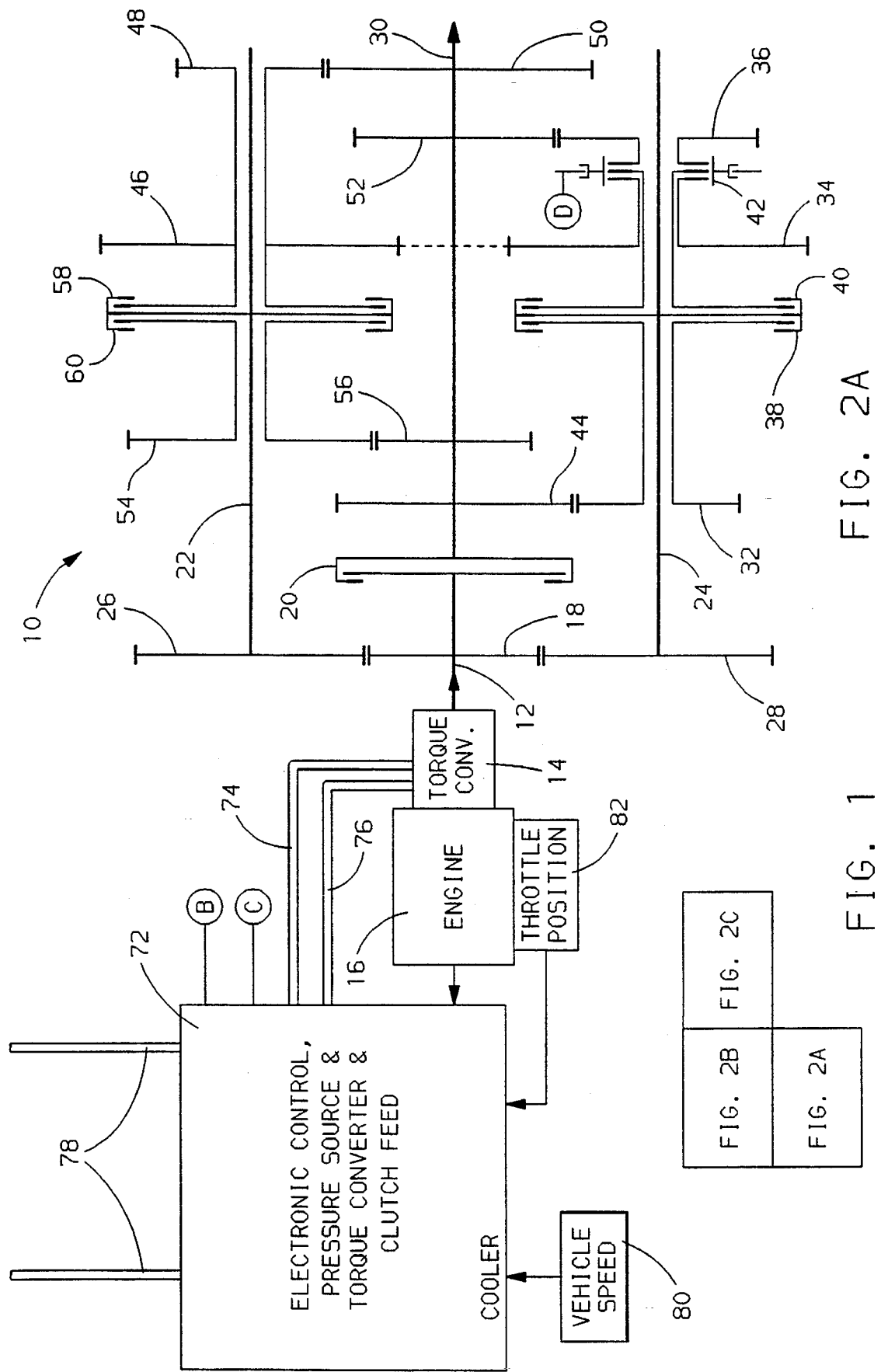

RATIO INTERCHANGE CONTROL VALVING

TECHNICAL FIELD

This invention relates to ratio interchange controls for power transmissions, and more particularly, to such controls wherein the off-going friction device has a predetermined hold pressure which is available in the portion of the ratio interchange.

BACKGROUND OF THE INVENTION

Many of today's multi-speed power transmissions utilize an orifice control for the pressure rate decay of an off-going friction device during a ratio interchange. While these devices are generally quite acceptable, the ratio interchange smoothness and timing can be improved by maintaining some pressure on the off-going clutch during the torque phase of the shift.

SUMMARY OF THE INVENTION

The present invention provides a shift control ratio interchange mechanism providing for the off-going friction device to be maintained at a reduced pressure during the torque phase of the shift while the on-coming friction device is controlled by a trimmer valve.

It is therefore an object of this invention to provide an improved shift control ratio interchange valve arrangement for a power transmission, wherein the off-going friction device is maintained at a low pressure for a predetermined time while the on-coming clutch is initially filling during the torque phase of the ratio interchange.

It is another object of this invention to provide an improved ratio interchange valve control for a power transmission, wherein a clutch hold pressure is maintained on the off-going clutch during a portion of the torque phase of the shift while the on-coming clutch is filled with a pressure and controlled in engagement by a trimmer valve.

These and other objects and advantages of the present invention will be more apparent from the following description and drawings.

DESCRIPTION OF THE DRAWINGS

FIG. 1 is a layout showing the relationship of FIGS. 2A, 2B and 2C.

FIGS. 2A, 2B and 2C are schematic representations of a power transmission and hydraulic control valving for a power transmission.

DESCRIPTION OF AN EXEMPLARY EMBODIMENT

Figure 2B:
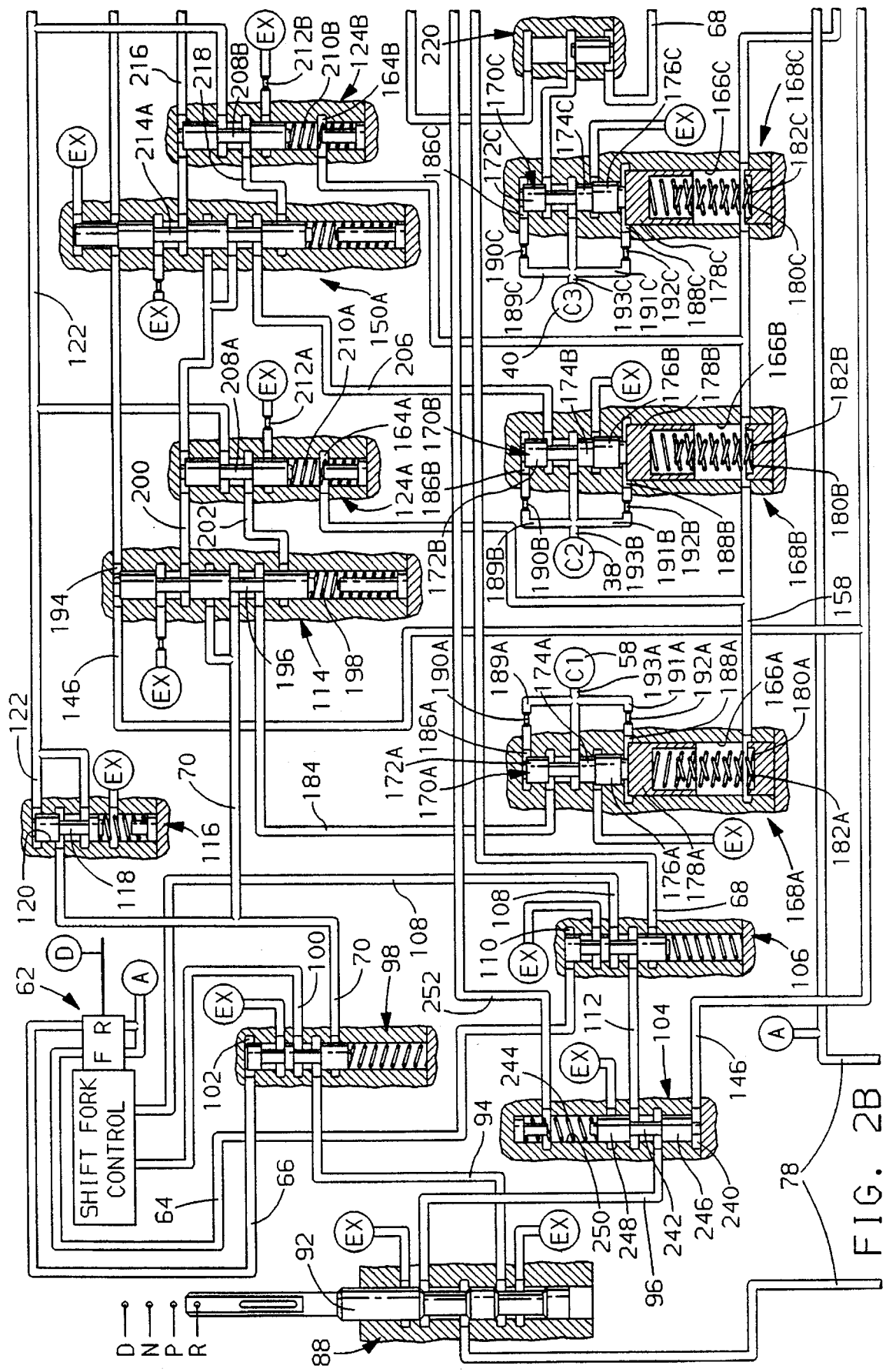

A power transmission 10 has an input shaft 12 driven by a torque converter 14 which in turn is driven by a conventional internal combustion engine 16. The input shaft 12 is drivingly connected to a gear member 18 and a clutch or friction device 20. The gear member 18 drives a pair of countershafts 22 and 24 via gear members 26 and 28, respectively. The clutch 20, when engaged, will couple the input shaft 12 directly to an output shaft 30.

The countershaft 24 has rotatably supported thereon a second ratio gear 32, a reverse ratio 34 and a third ratio gear 36. Also operatively connected with the countershaft 24 is a second ratio clutch or friction device 38 and a third ratio clutch or friction device 40. The second ratio clutch 38, when engaged, will connect the gear 32 with the shaft 24. The third ratio clutch 40, when operated, will provide a connection between a conventional synchronizer 42 and the shaft 24. The synchronizer 42 is selectively operable to connect either gear 34 or 36 to the clutch 40.

A first ratio gear 48 meshes with an output gear 50 which is drivingly connected to the output shaft 30 and will therefore provide a first or lowest ratio within the transmission when a first ratio clutch or friction device 58 is selectively engaged. The gear 34 meshes with a gear 46 which is rotatably supported on the shaft 22 and via first ratio gear 48 drives an output gear 50 which is connected with the output shaft 30. Thus, when the synchronizer 42 is selected to connect gear 34 with clutch 40 and the clutch 40 is selectively operated, a reverse ratio is provided between the input shaft 12 and the output shaft 30.

The gear 36 meshes a gear 52 which is drivingly connected with the output shaft 30, such that when the synchronizer 42 is selectively connecting the gear 36 with clutch 40 and the clutch 40 is selectively operated, a third forward ratio is provided in the transmission.

The countershaft 22 has rotatably supported thereon the gears 46 and 48, as previously mentioned, and a gear 54 which meshes with a gear 56 secured to the output shaft 30. The shaft 22 also has associated therewith the first ratio clutch or friction device 58 and a fifth ratio clutch or friction device 60. Selective engagement of the first ratio clutch 58 provides a drive connection between the shaft 22 and the gear 48, which is drivingly connected through the gear 50 with the output shaft 30. Thus, the clutch 58 will provide a first forward ratio.

The clutch 60, when engaged, will provide a connection between the shaft 22 and the gear 54 which, as previously described, meshes with gear 56 which is connected with the output shaft 30. Thus, on selected engagement of the clutch 60, a fifth ratio drive between the input shaft 12 and the output shaft 30 is provided.

The clutch 20, a previously mentioned, provides a direct drive connection between the input shaft 12 and the output shaft 30, and this is the fourth forward ratio.

The clutches 20, 38, 40, 58 and 60 are conventional fluid operated friction torque transmitting devices which construction is well known. The operation of these devices is fairly simple in that fluid is supplied to an engaging piston which enforces frictional engagement between interleaved plates which are respectively connected to housings and to the shaft to be driven. The housings may be connected either to another shaft or to gear members.

The synchronizer 42 is a conventional device which provides a mechanical drive connection between the output of the synchronizer and an input shaft. The synchronizer is controlled by shifting a sleeve axially to engage one or the other of the synchronizer hubs which is connected to respective members to be driven. The sleeve is generally controlled by a shifting fork which is, in turn, controlled by a fluid operated piston mechanism. One such mechanism is shown in U.S. Pat. No. 5,425,688, filed on Aug. 10, 1993, in the name of Raszkowski, and assigned to the assignee of the present invention. This shift fork control mechanism is generally indicated as 62 in FIG. 2B.

The shift fork control 62 has an output member D which is connected to operate the sleeve of the synchronizer 42. The operation of these hydraulically controlled shift forks is well known and the particular shift fork disclosed in the above patent application provides further features, wherein the shifting of the hydraulically controlled piston is also operable to control interlock mechanisms with valve members in the hydraulic control. These are known as passages 64 and 66 which are operable to establish reverse clutch feed in passage 68 and forward clutch feed in passage 70, respectively.

The engine 16 is operable to drive the torque converter 14, which has connected therewith a pressure source torque converter clutch feed and electronic control, generally designated 72. These are conventional electrical and hydraulic devices which are operable to provide the desired control functions within a power transmission. The pressure source, for example, may be one of the many positive displacement pumps, either an internal or external gear or vane type, which are well known. The torque converter and clutch feed and control circuits are known devices which are operable to provide selective pressurization of a torque converter apply circuit 74 or a torque converter clutch release circuit 76. The torque converter 14 is fed with hydraulic fluid no matter which of the torque converter clutch apply or torque converter clutch release circuits are pressurized.

The control 72 also includes such devices as a maximum system pressure regulator which supplies maximum system pressure to a main passage 78 and to a cooler, not shown. The control 72 receives vehicle speed signals 80 and throttle position signals 82. The control 72 is also connected to receive an engine speed signal. The control 72 provides output electrical signals B and C which are connected respectively to solenoid valves 84 and 86. These solenoid valves are preferably of the pulse width modulated type, such that a given voltage level or current level for the output of the solenoid valve is established. The signals B and C are generated in response to the vehicle speed signal 80 and throttle position signal 82, such that a combined pressure output at the solenoids 84 and 86 is established as a function of these input control signals.

The solenoids, as previously mentioned, operate the governor function which is described in U.S. Pat. No. 5,399,130, filed on Jun. 7, 1993, in the name of Long, and assigned to the assignee of the present invention.

The control 72 is operable to provide a pressure for controlling the engagement and shift points of the various clutches for the transmission 10. The transmission 10 can be built in accordance with the transmission disclosed in U.S. Pat. No. 5,009,118, issued to Ordo et al. on Apr. 23, 1991, and assigned to the assignee of the present invention. The main passage 78 is connected to a manual selector valve 88, to the solenoid valves 84 and 86, to a trim pressure control valve 90, and to the shift fork control 62. The manual valve 88 has a manually controlled spool portion 92 which is selectively movable to a plurality of positions including a forward drive position, a neutral park position and a reverse position. The valve 90 has two spool valve elements 91 and 93. A differential area exists between these valve elements 91 and 93.

In the forward drive position, the main passage 78 is connected to a forward passage 94 and in the reverse position, the manual selector valve 88 is operable to connect the main passage 78 to a reverse passage 96. The forward passage 94 is connected to a reverse-forward valve 98 which distributes fluid pressure via passage 100 to the shift fork control mechanism 62 which will then assume the forward position, such that main pressure is distributed via passage 66 to a forward hold chamber 102 on the valve 98 to urge the valve to admit fluid pressure to the forward clutch feed passage 70. At the same time, the passage 100 is exhausted and the shift fork control mechanism 62 will remain in the forward position.

If the manual selector valve 88 is moved to reverse, the passage 96 is pressurized, such that a reverse inhibit valve 104 is effective to distribute fluid to a forward-reverse valve 106 which in turn directs fluid via a reverse synchronizer passage 108 to the shift fork control mechanism 62. Fluid pressure in passage 108 will cause fork control 62 to assume the reverse position which will direct fluid pressure via passage 64 to a reverse hold chamber 110 formed on the valve 106. This will result in the valve 106 to assume its shifted position such that main pressure is distributed via a passage 112 to the reverse feed passage 68.

The forward clutch feed passage 70 is disposed in fluid communication with a 1-2 shift valve 114 and a clutch hold regulator valve 116. The clutch hold regulator valve 116 has a valve spool 118 slidably disposed in the valve bore 120 and is responsive to fluid pressure in passage 70 to provide a reduced pressure in a clutch hold passage 122. This pressure in passage 122 is referred to as a clutch hold pressure which, as will be described later, is effective to provide a reduced clutch engaging pressure to the various clutch devices in a prescribed mariner.

The passage 122 is connected with a plurality of trip valves 124–124A is the first speed trip valve; 124B is the second speed trip valve; 124C is the third speed trip valve and 124D is the fourth speed trip valve.

In the detailed description which follows, and as previewed in the previous paragraph, a particular structural member, component or arrangement may be employed at more than one location. When referring generally to that type of structural member, component or arrangement, a common numerical designation shall be employed. However, when one of the structural members, components or arrangements is so identified as to be individually identified, it shall be referenced by a letter suffix employed in combination with the numerical designation. Thus, there are at least four trip valves which are generally identified by the numeral 124, but the specific individual trip valves are therefore identified as 124A, 124B, 124C and 124D in the specification and on the drawings. This same suffix combination shall be employed throughout the specification.

The solenoid valves 84 and 86 provide output pressures at passages 126 and 128, respectively, which communicate with a governor valve 130. Governor valve 130 has a spool valve 132 which is slidably disposed in a valve bore 134 to control distribution of the fluid pressure in passage 126 to a passage 136 and from the passage 128 to a passage 138. The passages 136 and 138 are connected to opposite ends of a spool valve 140 which is a member of a governor valve 142.

The spool valve 140 is slidably disposed in a valve bore 144 which is operable to control distribution of fluid pressure from passage 136 to a governor passage 146 and to control distribution of fluid pressure in passage 138 to a trim passage 148. The valve spool 140 responds to the higher of the pressures in passage 136 and 138, such that if the pressure in passage 138 is higher, the spool valve 140 will control distribution of pressure in passage 138 to passage 146, and from passage 136 to passage 148. This is one of the features which is described in U.S. Pat. No. 5,399,130, filed Jun. 7, 1993, in the name of Long, and assigned to the assignee of the present invention. The governor valve 142 is effective to distribute the highest output governor pressure in passage 136 and 138 to the passage 146 and the lower of the two pressures to passage to trim passage 148.

Figure 2C:
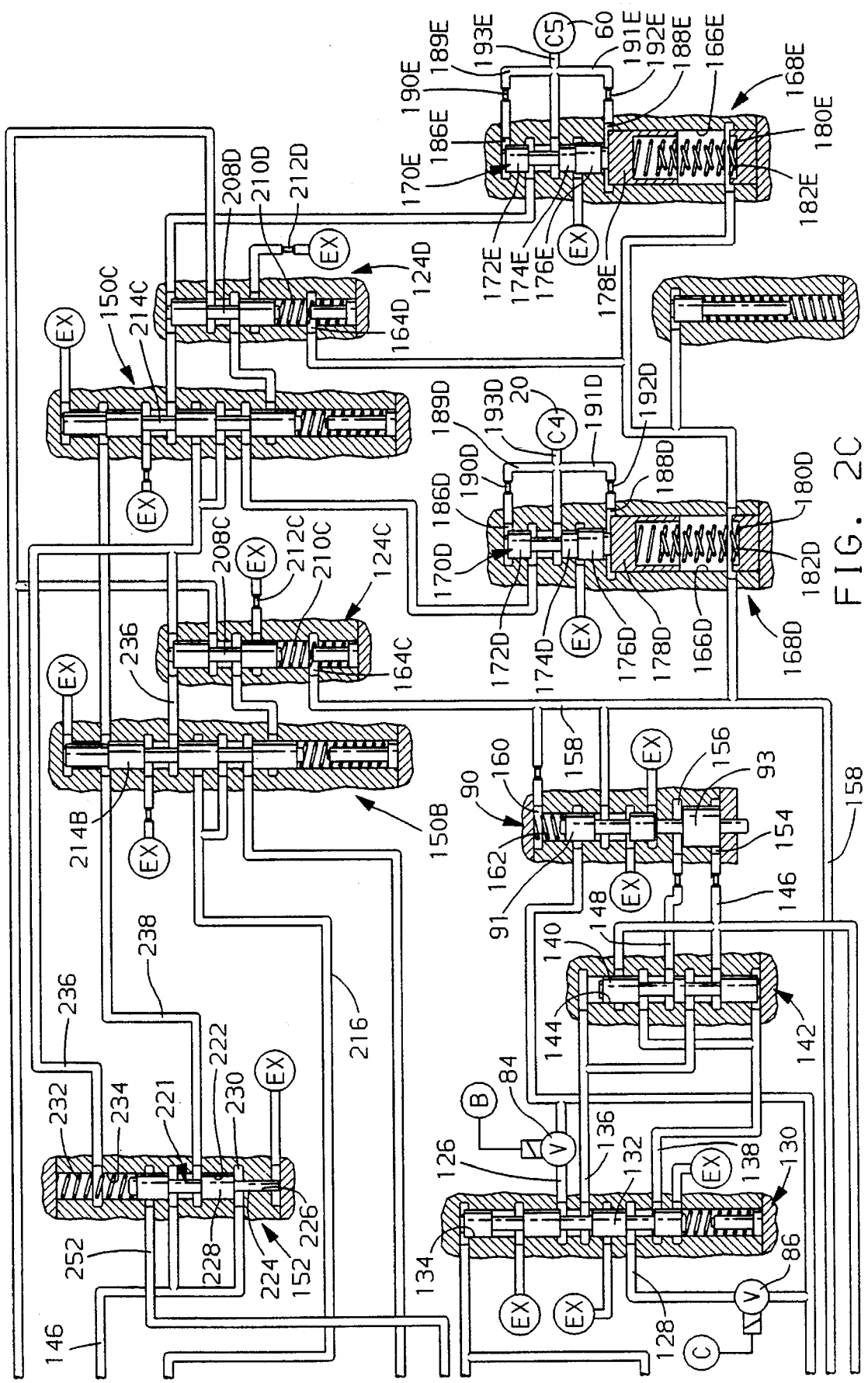

Generally, when the controls are functioning as desired, the pressure in passage 136 will always be higher than or equal to the pressure in passage 138, such that the fluid connection shown in FIG. 2C will be attained. The pressure in passage 146 is connected with the reverse inhibit valve 104, the 1–2 shift valve 114, a 2–3 shift valve 150 and a third ratio latch valve 152. The passage 146 is also connected to a control chamber 154 on the trim pressure control valve element 93.

The pressure in passage 148 is connected to a control chamber 156 on the trim pressure control valve 93. The area of control chamber 154 is equal to the area of control chamber 156 such that the output pressure in trim passage 158 will be responsive to the difference in pressures in the respective passages 146 and 148 times the differential area between 91 and 93.

When the transmission is commanded to change ratios, the governor pressure in passage 146 is boosted by the solenoid valve 84 such that the pressure in chamber 154 will be higher than or equal to the pressure in chamber 156. During the governor pressure change, the pressure in passage 148 is set by solenoid valve 86 to a level to establish the desired trim pressure in passage 158. The pressure in passage 158 is operable in a control chamber 160 formed at one end of the valve 91 to control the distribution of pressure from the main passage 78 to the trim passage 158. As the pressure in trim passage 158 increases, the pressure in chamber 160 and a control spring 162 will be effective to balance the pressure in the chamber 154 and thereby establish a new trim pressure to be utilized during the shift sequence.

When the ratio interchange has been completed, the pressure output of solenoid valve 86 will be increased thereby increasing the pressure in passage 148 which will be effective in the chamber 156 to assist in reducing the pressure in trim passage 158. The trim passage 158 is in fluid communication with a trim chamber 164 on the trip valves 124. The pressure in passage 158 is also in fluid communication with a trim boost chamber 166 formed in a plurality of trim valves 168. The trim valve 168B is effective to control the engagement pressure in the second ratio clutch 38 during the ratio interchange. The trim valves 168A, 168C, 168D and 168E, control the trim pressure or clutch control engagement pressure in the clutches 58, 40, 20 and 60, respectively.

When the manual valve is moved to the forward position and the synchronizer 42 has been positioned to the forward position, the forward clutch feed passage 70 will distribute pressure via the 1–2 shift valve 114 to the trim valve 168A. The trim valve 168A includes a valve spool 170A, which has three lands 172A and 174A which are of equal diameter, and 176A which is of a larger diameter. The valve land 176A is disposed adjacent a trim plug 178A which is subject to the pressure in a trim chamber 188A and is operated on by a pair of springs 180A and 182A.

When the manual valve is moved to the forward position, the 1–2 shift valve 114 distributes pressure via a passage 184 to the trim valve 168A which admits pressure to the clutch 58 between the lands 172A and 174A. The fluid pressure distributed to the clutch 58 is also received in a feedback chamber 186A and the trim chamber 188A through passages 189A, 191A and restrictions 190A and 192A, respectively.

The pressure in trim chamber 188A is effective on the diameter of land 176A, while the pressure in chamber in 186A is effective on the relatively smaller diameter of land 172A.

The restriction 190A preferably permits more rapid fluid flow to the chamber 186A than does the restriction 192A permit flow to the chamber 188A. Thus, the fluid pressure in chamber 186A will develop more rapidly tending to move the valve spool 170 downward thereby closing off the passage 184 to control the pressure rise in passage 193A and in the clutch 58. The pressure in chamber 188A will cause stroking of the plug 178A against the spring 180A initially, and as the plug progresses downward in the chamber 166A, the spring 182A will be contacted as the chamber 188A expands.

As the pressure increases in the chamber 188A, the valve spool 170A will move upward, due to the differential area, thereby admitting more pressure to the clutch 58 which will result in increased pressures in the chambers 186A and 188A. This pressure rise control will continue until the clutch 58 is fully engaged. It should be noted that the pressure rise within the chamber 188A is affected by the trim boost pressure in chamber 166A and the rate of the springs 180A and 182A. When the trim pressure in passage 158 is elevated, the initial pressurization of clutch 58 will be rapid and then the rate of springs 180A and 182A will control the rate of pressure rise. Thus, if the operator is providing a heavy throttle for requiring significant torques, the clutch will receive an initial rapid engagement or takeup of the piston, such that there will be minimum slippage during the engagement of the clutch 58.

When the control 72 senses that a 1–2 upshift is desired, the pressure in the governor passage 146 will be increased such that a shift chamber or control chamber 194 will be pressurized sufficiently to permit a 1–2 valve spool 196 to overcome force in a spring 198 resulting in the valve spool being shifted to the second ratio position. In the second ratio position, the valve spool 196 is effective to distribute clutch feed pressure in passage 70 to a second clutch feed passage 200 and to connect a clutch release passage 202 to the passage 184.

Figure 3:
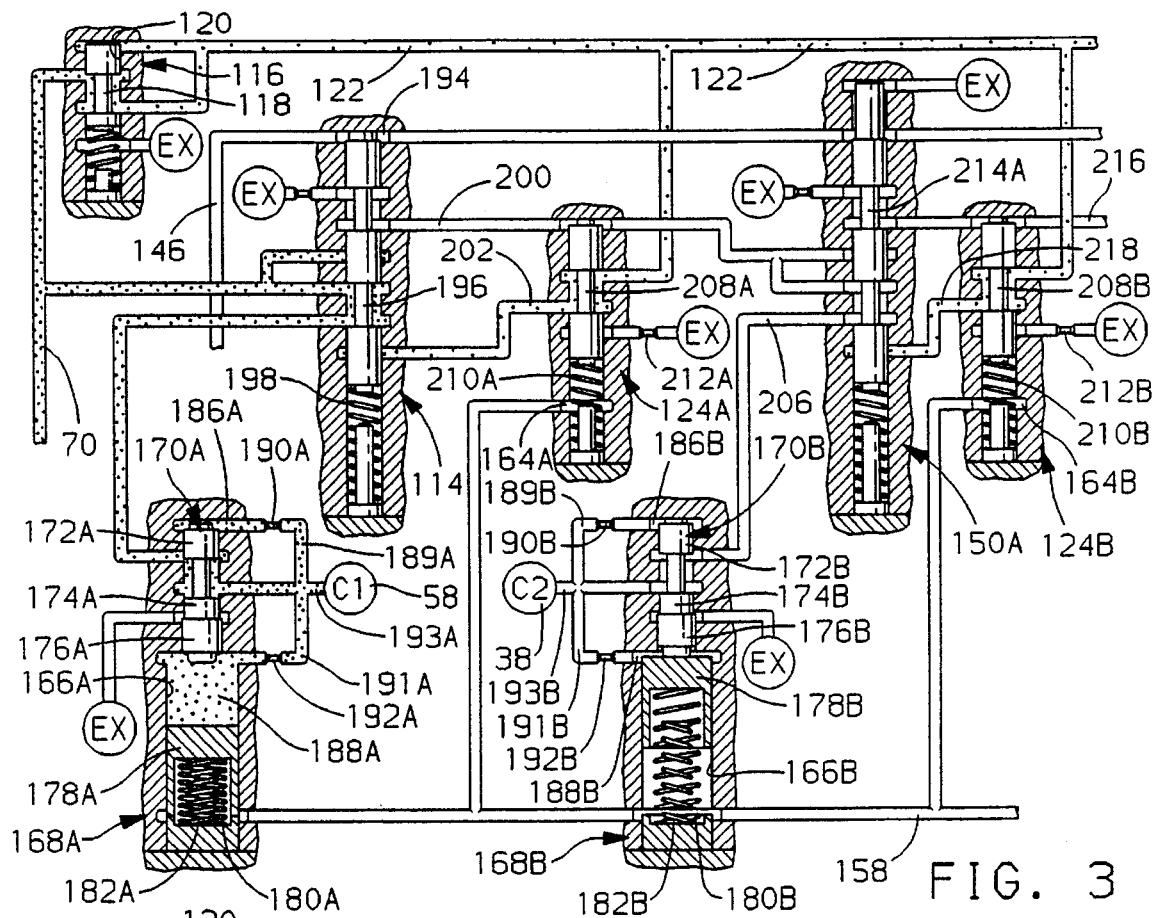
FIGS. 3 through 6 are schematic representations of a portion of the schematic of FIG. 2B showing the valving in various operating positions during a ratio interchange.

As viewed in FIG. 3, the valving is conditioned for the first and lowest drive ratio within the transmission. Under these conditions, the friction device 58 is connected with high pressure fluid from the forward clutch feed passage 70 via the 1–2 shift valve 114. During the engagement of the friction device 58, the chamber 188A expands at a controlled rate to prevent harsh engagement of the friction device 58.

Figure 4:
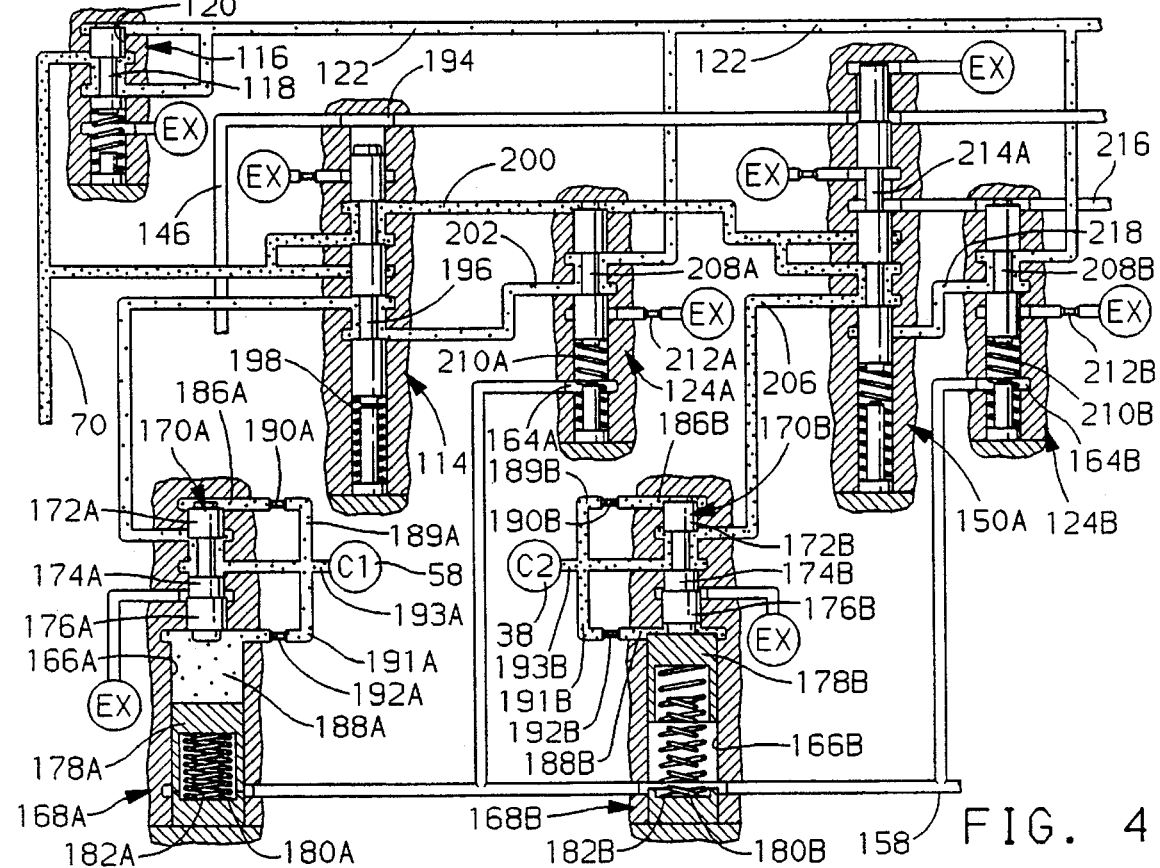

When the control mechanism 72 senses the vehicle operating conditions are proper for a first to second ratio interchange, the pressure in governor passage 146 will be elevated, such that the valve spool 96 of the 1–2 shift valve 114 will be moved to the pressure set position shown in FIG. 4. In this position, the high pressure fluid in the forward clutch feed passage 70 is directed to the top of the first trip valve 124 and via passage 200 to the 2–3 shift valve 150A. The valve spool 214A of the 2–3 shift valve 150A directs the fluid to the passage 206 which is connected with the second trim valve 168B. The pressure at the trim valve 168B is directed via the valve spool 174B to the friction device 38 by a passage 193B and also via passages 189B and 191B, respectively, through restrictions 190B and 192B.

The fluid passing through restriction 190B operates on the end of land 172B while the pressure passing through restriction 192B acts in the chamber 188B which is effective both on the land 176B and the plug 178B. At this point, the clutch or friction device 38 begins to fill with fluid, such that the ratio interchange from first to second will begin.

Simultaneous with the shift valve 114 assuming the second ratio position, the first trim valve 168A is connected via first trip valve 124A and the shift valve 114 with the low pressure clutch hold fluid which is available in passage 122. This substantially reduces the pressure in the friction device 58 thereby reducing the torque capacity of this device, such that there will be little or no tie up between the friction devices 38 and 58 during the ratio interchange. Since the hold pressure introduced to the friction device 58 is reduced from the previous clutch engagement pressure, the plug 178 will begin to exhaust the chamber 188A.

Figure 5:
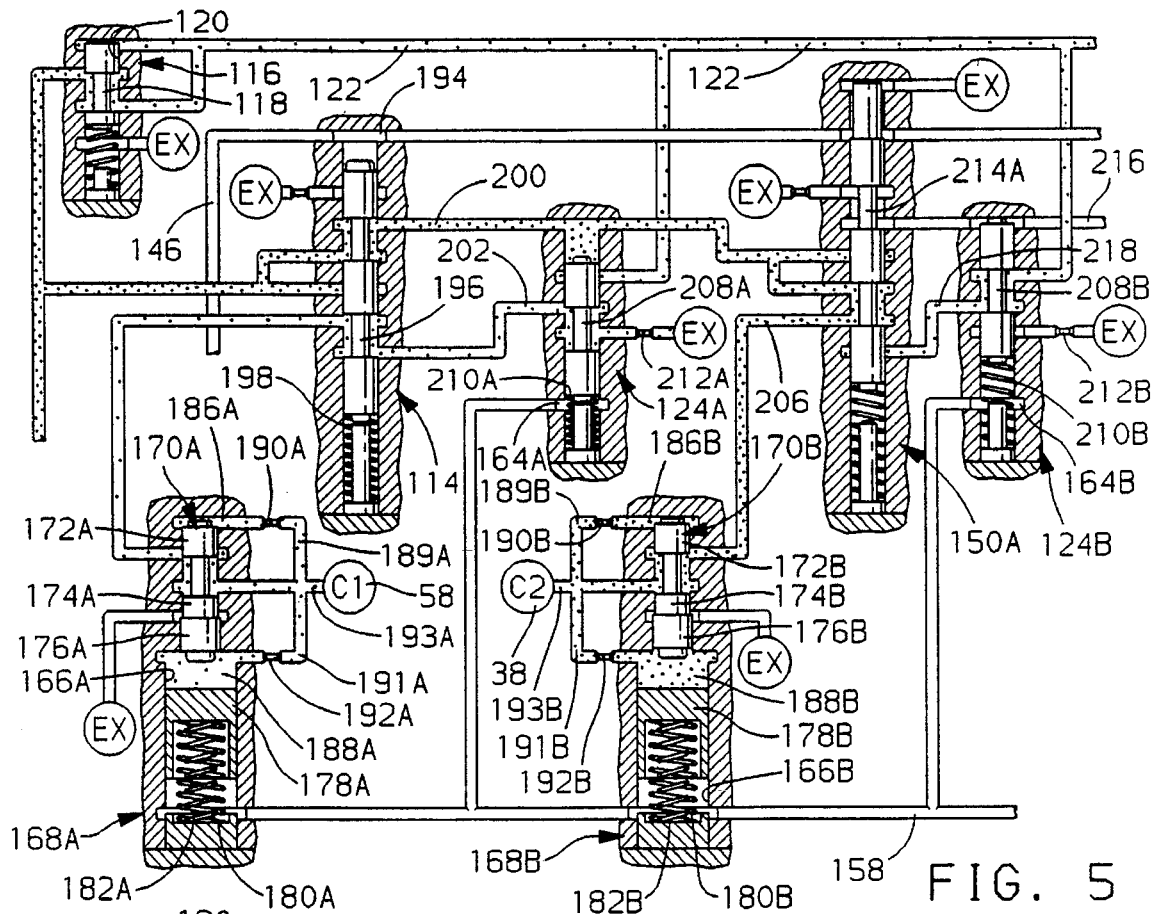

As seen in FIG. 5, the pressure in passage 200 will reach a level sufficient to overcome the force in spring 210A causing the first trip valve 124A to assume the pressure set position shown in FIG. 5. At this point, the friction device 58 is connected via the 1–2 shift valve 114 and the trip valve 124A with an exhaust passage, such that complete disengagement of the friction device 58 can be attained.

While the movement of the shift valve 124 is occurring, the pressure in passage 193B feeding the friction device 38 will continue to increase under the control of the second trim valve 168B. The pressure in passage 191B will increase with the clutch fill pressure and will cause the chamber 188 to expand by moving the plug 178 downward against the spring 180B.

As the pressure in the chamber 188B increases, the valve spool 174B is moved to a metering location as controlled by the differential area between lands 176B and 172B and the pressures which are acting on these lands. The pressure acting on the land 172B will be substantially equal to the clutch engagement pressure, since the chamber formed by the valve land and the end of the spool is small compared with chamber 188B.

The chamber 188, being an expanding chamber, will require fluid flow through the restriction 192 to fill the chamber, such that the pressure downstream of the restriction 192 (that is, the pressure in chamber 188) will be less than the pressure in the clutch passage 193. The valve spool 170 will meter the incoming fluid to a pressure which will balance the valve spool in response to the respective pressures acting upon lands 176 and 172.

It should be appreciated, at this point, that the incoming fluid in passage 206 and 193B does not have an exhaust path available to it. That is, all of the fluid being supplied via the 2–3 shift valve 150A is utilized in either filling the accumulator expanding chamber 188B or in filling the friction device 38. Since the fluid is not exhausted directly at any point, there is very little hydraulic efficiency loss at the point of shift control during this shifting process.

Figure 6:
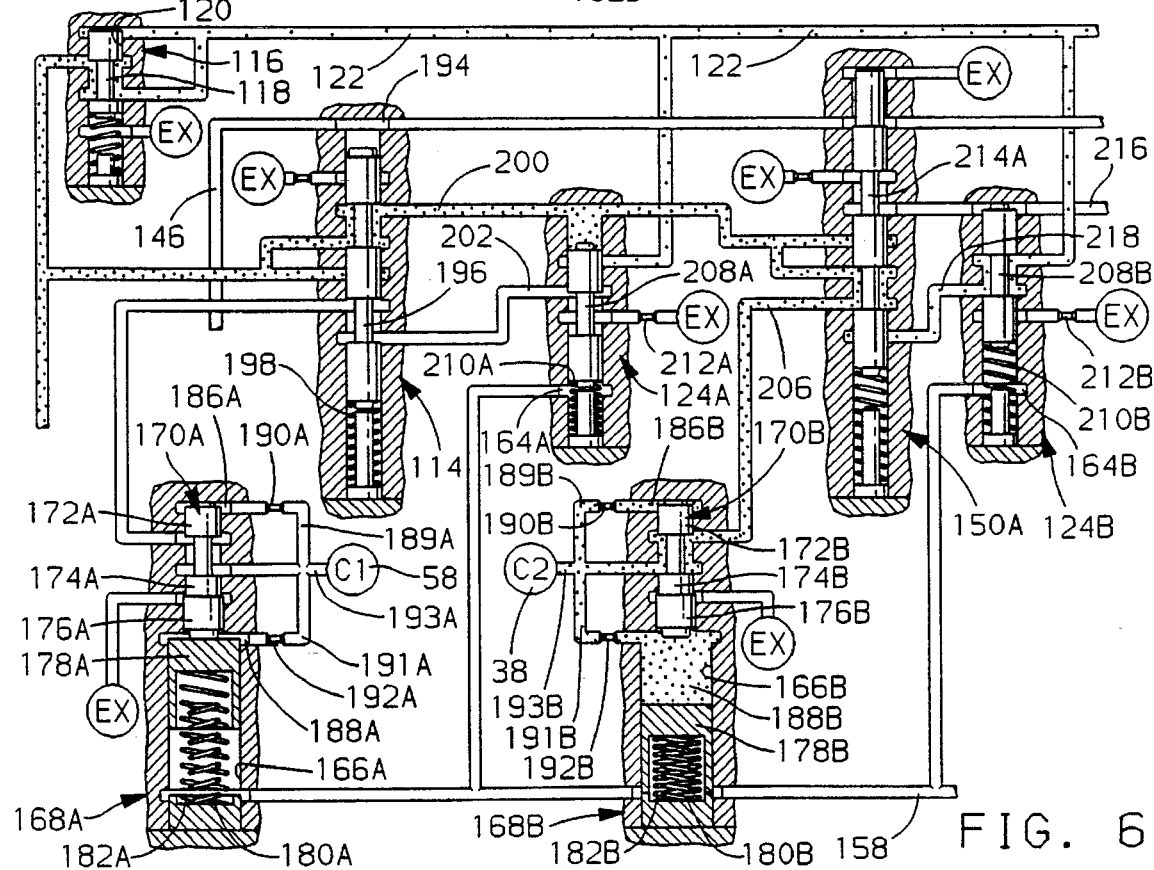

The valve position depicted in FIG. 6 shows the completion of the 1–2 ratio interchange. It can be seen in FIG. 6 that the chamber 188B is expanded to its maximum, such that both springs 180B and 182B have been compressed. Also, it should be noted that the chamber 188A has been reduced to a minimum volume as controlled by the plug 178A and the spring 180A.

The differing lengths of springs 180 and 182 provide a rate change function in the fill pressure curve of the oncoming friction device. That is, during the portion of the fill shown in FIG. 5, the rate is determined solely by the rate of spring 180 while the fill rate or pressure rise rate is controlled by the rate of both springs 180B and 182B as the plug 178B moves from the position shown in FIG. 5 to the position shown in FIG. 6.

The pressure utilized to fill the friction devices and the accumulator chamber is connected directly to exhaust only when the shift valve and trip valve provide such a passage. This passage is only provided during clutch disengagement. Since the clutch engagement fluid must be exhausted regardless of the type of trimmer valve used, the system efficiency is identical with prior art systems at this point. However, there is a considerable improvement in efficiency by not permitting the exhausting of fluid from the high pressure clutch fill circuit during the engagement of a clutch.

The remaining interchanges, that is the 2–3, 3–4 and 4–5 ratio interchanges are accomplished in a manner similar to that described for the 1–2 interchange. During each of these changes, the respective trimmer valve 168 will function to provide the proper pressure rate increase for its on-coming device, while each off-going device will be subjected to an initial hold pressure, and then exhausted during the ratio interchange.

The passage 200 is connected to the 2–3 shift valve 150A which, in the second ratio position, is effective to distribute the pressure from passage 200 to a second clutch apply passage 206. The fluid pressure in passage 206 is distributed to passage 193B via the second trim valve 168B to control the engagement of the clutch 38.

Simultaneous with the establishment of fluid pressure in the clutch 38, fluid pressure in the clutch hold passage 122 will be distributed via the first trip valve 124A to the passage 184 which will reduce the pressure in the clutch 58 to a value equal to the pressure in the passage 122. This pressure will prevent the complete disengagement of the clutch 58 pending initial engagement of the clutch 38.

However, as the pressure in passage 200 is increased, a force on a spool valve 208A of the first trip valve 124A will be urged downward against a spring 210A. This downward force is counterbalanced also by fluid pressure in the trim passage 158. Thus, the higher the torque level desired or commanded by the operator, the longer the delay will be in moving the trip valve 124A. Until the trip valve 124A is shifted such that the valve spool 208A will discontinue fluid connection between passages 122 and 202, the pressure in the clutch 58 will remain at the hold pressure level. When the valve spool 208A moves downward, the passage 202 will be connected to exhaust and the passage 122 will be blocked permitting the clutch 58 to be exhausted through a restriction 212A. The trim valve 168B will function to control the pressure rise in the clutch 38 in a manner similar to that described above for the pressure rise control in clutch 58.

As the control 72 continues to sense the vehicle speed and throttle position, a shift command to the 2–3 shift valve 150A will be issued resulting in the governor pressure being increased sufficiently in passage 146 to cause a spool valve 214A to be shifted to the third ratio position such that fluid pressure in passage 200 will be communicated to a third clutch feed passage 216 and the passage 206 will be communicated with a clutch disengage passage 218 through the trip valve 124B. The trip valve 124B will control the reduced pressure in clutch 38 in a manner described above for the clutch 58 while the pressure in passage 216 will be directed through a 3–4 shift valve 150B and a shuttle valve 220 to the third trim valve 168C which will, in the manner described previously for clutches 38 and 58, control a pressure rise in the third clutch 40.

The trim valve 168C will control the pressure rise in clutch 40 while the trip valve 124B controls the disengagement pressure of the clutch 38, such that the ratio interchange between second and third ratio will proceed in an orderly manner.

The governor passage 146 is in fluid communication with the third latch valve 152. The third latch valve 152 includes a valve spool 221 which is slidably disposed in a bore 222. The valve spool 221 has an end 224 slidably disposed in a bore 226 such that a differential area between a lower land 228 and the end 224 is established. These areas cooperate to provide a differential area or control chamber 230.

The valve spool 221 is urged, as shown in FIG. 2C, by a spring 232 toward the chamber 230. The spring 232 is disposed in a spring chamber 234 which is in fluid communication with a fourth clutch passage 236. When this passage is pressurized during fourth clutch engagement, the third latch valve 152 will be maintained in the position shown. In this position, the pressure in governor passage 146 is distributed to a 4–5 governor passage 238 which is distributed to the 3–4 shift valve 150B and a 4–5 shift valve 150C.

If the pressure in governor passage 146, prior to fluid pressure becoming available in passage 236, is sufficient in the chamber 230 to overcome the force in spring 232, the valve spool 221 will be shifted to a pressure position which will disconnect the 4–5 governor passage 238 from the governor passage 146 thereby preventing a shift signal from reaching shift valves 150B and 150C. However, the signal in governor passage 146 will not be sufficiently high to overcome the spring, under normal operating conditions, prior to the fourth clutch being engaged. This signal will be sufficiently high if the electrical signal to solenoids 84 and 86 is discontinued. When this occurs prior to a 3–4 upshift, the output pressure of the valve 130 will be equal to main pressure, such that the governor pressure in the chamber 230 will immediately shift the third latch valve 152 to the pressure set position, thereby preventing the 3–4 and 4–5 shift valves from assuming their upshifted position.

During normal operation, however, the fluid pressure in passage 238 will be elevated when a 3–4 upshift is required by the control 72, resulting in the trim valve 168D being operative to control the pressure in the fourth ratio clutch 20 and the trip valve 124C being effective to control the pressure decay in the clutch 40.

It should be noted that when the 3–4 shift valve 150B assumes the upshifted or fourth ratio position, the passage 236 is pressurized thus providing a bias signal in the spring chamber 234 which will prevent the third latch valve 152 from being shifted from the spring set position. This passage 236 remains pressurized whenever fourth or fifth ratio is established.

Continued pressure rise in the governor passage 146 and therefore governor passage 238 will occur when the control 72 establishes that a 4–5 upshift is required. When a 4–5 upshift is required, the valves 150C will assume the upshifted position, such that the trip valve 124D will control the disengagement of clutch 20 while the trim valve 168E controls the engagement pressure rise in the clutch 60.

Figure 7:
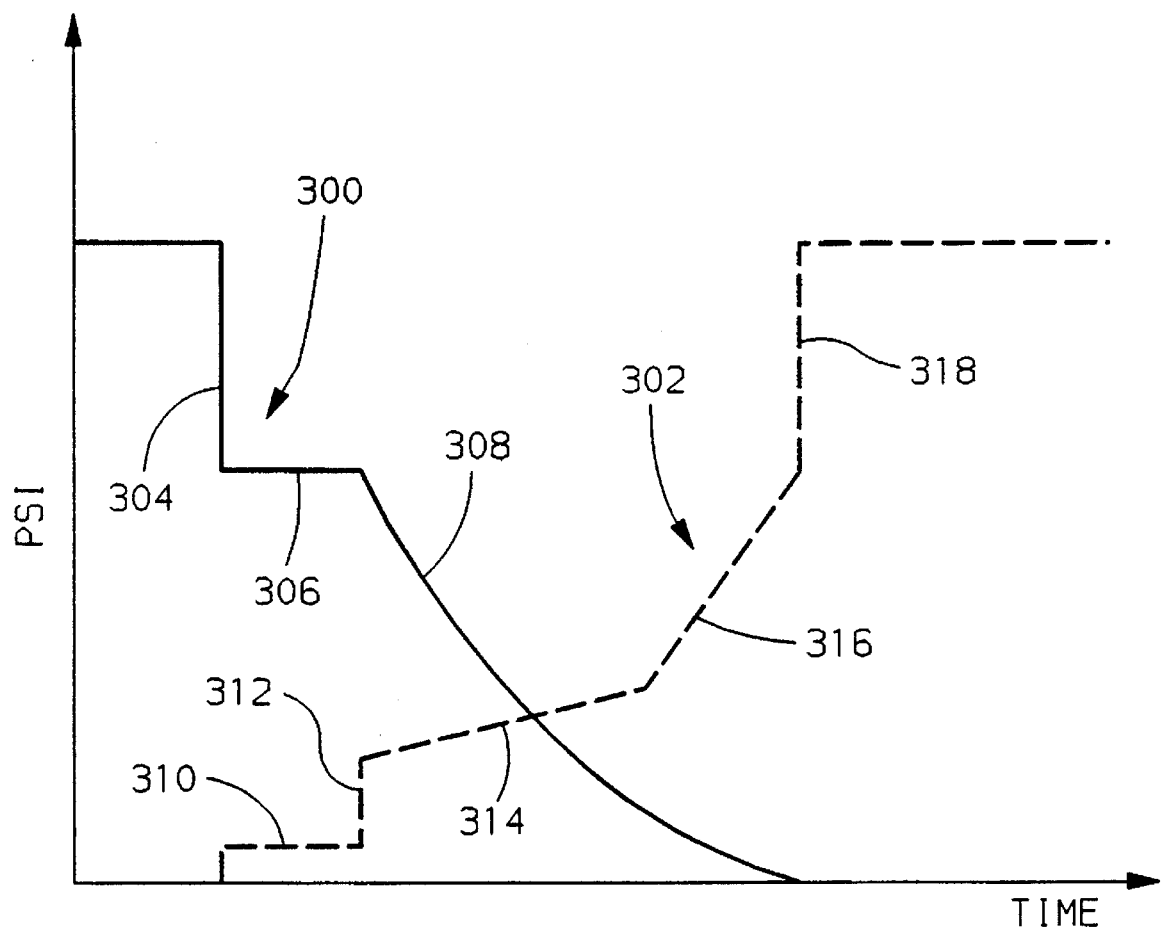
FIG. 7 is a graphical representation of the pressures in the off-going and on-coming friction devices during a ratio interchange.

As shown in FIG. 7, the pressure schedule of the off-going friction device is shown by curve 300 while the pressure schedule for the oncoming friction device is shown by curve 302. As can be seen in FIG. 7, the off-going pressure of curve 300 takes an initial steep drop, as represented by line 304, and then is provided with a step function represented by line 306. The line 306 is the time during which the hold pressure, as supplied by the hold regulator valve 116, is effective on the friction device 38. The pressure in the off-going friction device 38 then decays along the line 308 which is a result of the exhaust restriction 212A of the first trip valve 124A.

The on-coming friction device 58 has an initial step function at curve portion 310 which represents the initial take-up of the springs within the piston of the friction device and the filling of the piston chamber for the friction device. A rapid rise will occur when the clutch or friction device piston is filled as represented by line 312. The pressure fill rate will then follow the line 314 which is in pan representative of the rate of the spring 180B. When the accumulator plug or trimmer plug 178B abuts the spring 182B, the pressure rate or fill rate will change as represented by the line 316 of the curve 302. Thus, the rate function changes during the engagement of the on-coming friction device.

When the plug 178B has fully stroked, the pressure in the oncoming friction device will readily rise as represented by the line 318 to provide maximum pressure for the friction device throughout the operation in the range to which the transmission has been shifted.

The control valving, as shown in FIGS. 2B and 2C, is designed to operate with a five speed countershaft type transmission. These transmissions utilize one clutch per range as is evident from the depiction of FIG. 2A and the description of the gearing shown therein. However, any multiple clutch multi-speed automatic transmission can utilize the hold clutch pressure arrangement which is described with this specification. The shifting mechanism simply requires two friction devices, a signal shift valve, a trip valve and a trimmer on each clutch or friction device. Thus, any single transition ratio interchange can utilize the invention described herein.

Prior to the ratio interchange, the first friction device and trimmer is supplied with fluid pressure to maintain the device engaged. The clutch hold pressure is regulated by the downstream regulator valve 116 but is blocked from entry to the first friction device by the 1–2 shift valve 114. A shift interchange begins when the governor pressure in passage 146 is sufficient to cause the shift valve 114 to attain the pressure set position shown in FIG. 4, and while the trip valve 124A is maintained in the spring set position shown in FIG. 4. The spring set position of trip valve 124A is determined by three factors—the trim pressure in passage 158, the force in the spring 210A and the pressure in the on-coming friction device 38. When the pressure in the on-coming device 38 is sufficient to overcome the trim pressure and the spring force, the trip valve will be shifted to the pressure set position.

During the spring set position, the hold pressure in passage 122 is directed to the off-going friction device 58. This maintains the pressure in that device as depicted by the line 306 shown in FIG. 7. When the oncoming friction device 38 fills and reaches its initial pressure, the trip valve will stroke. When the trip valve strokes or assumes the pressure set position, it blocks the clutch hold regulator pressure in the passage 122 from reaching the off-going friction device 58 and simultaneously directs the fluid in the off-going friction device 58 through an orifice exhaust. The on-coming friction device 38 completes its actuation under the control of the trim valve 168B. The other ratio interchanges 2–3, 3–4 and 4–5 are similarly accomplished.

During a downshifting sequence, for example, from 5 to 4, the off-going clutch 60 will be immediately exhausted through the shift valve 150C and an orifice while the on-coming clutch 20 will have the pressure engagement cycle controlled by the trim valve 168D. These same sequences will occur on a 4–3 downshift, a 3–2 downshift and a 2–1 downshift. The respective valves will control the engagement of the on-coming clutch while the off-going clutch is released or disengaged through the respective shift valve and orifice.

It should also be noted that the governor passage 146 is connected to a control chamber 240 on the reverse inhibit valve 104. When the governor pressure in passage 146 attains a predetermined level, a spool 242 of the valve 104 will be moved to a pressure set position against the force in a spring 244. In this position, the reverse passage 96 is blocked by a land 246 and the passage 112 is exhausted between the land 246 and a land 248. This will effectively prevent an inadvertent reversing engagement as long as the governor pressure is above this predetermined value.

The spring 244 of the reverse inhibit valve 104 is disposed in a spring chamber 250 which is in fluid communication with a governor passage 252 which is connected with the third latch valve 152. As seen in FIG. 2C, when the valve spool 221 is moved upward against the spring 232, fluid pressure in the governor passage 146 is directed between the lands of valve spool 221 to the passage 252. Thus, during a discontinuance of the electrical signal to the solenoid valves 84 and 86, the passage 252 will be subjected to main line pressure as will the chamber 250. High fluid pressure in the chamber 250, along with the spring 244, will force the reverse inhibit valve 104 to assume the position shown in FIG. 2B. This will permit the selection of a reverse drive by the manual valve whenever an electrical discontinuance has occurred.

During an electrical discontinuance, the operator, if operating in fourth or fifth gear, will maintain that gear operation. In fact, the system will remain in fifth gear until the vehicle is brought to a halt. During this slowing of the vehicle, the operator will recognize that there is an inappropriate function occurring and will recognize that there is some need for repair.

Upon bring the vehicle to a halt and shifting the manual valve to neutral, the pressure to the various clutches is discontinued, such that all the clutches will disengaged. At this point, the governor output pressure in passage 146 will be at a maximum thereby triggering third latch valve 152 to the pressure set position and the reverse inhibit valve to the spring set position. Should the operator select a forward drive position at the manual selector valve, the system will immediately condition the transmission for operation in the third gear by engaging the clutch 40, while the clutches 38 and 58 are exhausted through their respective trip valves.

The governor pressure in passage 238 is not pressurized and therefore the valves 150B and 150C cannot be upshifted, thus the third gear forward is the only possible ratio available. Should the operator shift to reverse, the reverse inhibit valve will be held in the spring set or reverse position which will result in fluid pressure in passage 112 being operable to control the shift fork control 62 resulting in pressure setting of the valve 106 and pressurization of the passage 68. Pressurization of the feed passage 68 will operate on the valve 130 thereby exhausting the governor pressure and simultaneously moving the shuttle valve 220 to the reverse position, such that the pressure in passage 68 is directed to the clutch 40. The engagement of the clutch 40 will be controlled by the trim valve 168C to establish the reverse drive within the transmission.

Shifting from reverse to forward drive will result in the reverse circuit being exhausted through passage 96 at the manual valve 88 and simultaneously pressurizing the forward passage 94 which will energize the control 62 to engage the synchronizer in the forward position and provide the pressurization of the passage 70 which, as previously described, will result in energization of the clutch 40 and the establishment of the third forward ratio.

From the foregoing description, it should be obvious that the control will permit the establishment of one forward ratio and one reverse ratio upon the discontinuance of the electrical control system.

The embodiments of the invention in which an exclusive property or privilege is claimed are defined as follows:

1. In combination, a hydraulic control and means for providing fluid operated friction torque transmission comprising:

a source of high pressure;

a source of low pressure;

first means for providing friction torque transmission;

second means for providing friction torque transmission;

first fluid directing means for selectively controlling fluid flow from the source of high pressure to the first means and to a passage;

second fluid direction means for selectively controlling fluid flow from the source of high pressure to the second means when the first fluid directing means is selectively controlling fluid flow to said passage;

trim means responsive to fluid flow to said second means for providing a time controlled pressure rise at the second means; and valve means in said passage for selectively directing fluid flow from said source of low pressure to said first means through said first fluid directing means when said first fluid directing means is selectively controlling fluid flow to said passage and for disconnecting said first fluid directing means from said source of low pressure when fluid pressure in said passage is at a predetermined level.

2. In combination, a hydraulic control and means for providing fluid operated friction torque transmission comprising:

a source of clutch pressure;

a source of hold pressure;

a first clutch for providing friction torque transmission;

a second clutch for providing friction torque transmission;

a first shift valve for selectively controlling fluid flow from said source of clutch pressure to the first clutch and to a passage;

a second shift valve for selectively controlling fluid flow from said source of clutch pressure to the second clutch when the first fluid directing means is selectively controlling fluid flow to said passage;

a trim valve responsive to fluid flow to said second clutch for providing a time controlled pressure rise at the second clutch; and valve means in said passage for selectively directing fluid flow from the source of hold pressure to said first clutch through said first shift valve when said first shift valve is selectively controlling fluid flow to said passage and for disconnecting said first shift valve from said source of hold pressure when the fluid pressure in said passage is at a predetermined level as controlled by the trim valve.

* * * * *